United States Patent [19]
Frey, Jr. et al.

[11] Patent Number: 5,181,017
[45] Date of Patent: Jan. 19, 1993

[54] ADAPTIVE ROUTING IN A PARALLEL COMPUTING SYSTEM

[75] Inventors: Alexander H. Frey, Jr., Pasadena, Calif.; Joel M. Gould, Norwood, Mass.; Charles M. Higgins, Jr., Baton Rouge, La.

[73] Assignee: IBM Corporation, Armonk, N.Y.

[21] Appl. No.: 386,521

[22] Filed: Jul. 27, 1989

[51] Int. Cl.⁵ .................... H04L 12/00; H04L 12/46
[52] U.S. Cl. .................... 340/825.02; 395/200; 340/826; 340/827
[58] Field of Search ... 364/200 MS File, 900 MS File; 370/58; 379/826; 340/825.02, 827; 395/200

[56] References Cited

U.S. PATENT DOCUMENTS

| | | | |
|---|---|---|---|
| 4,399,531 | 8/1983 | Grande et al. | 370/60 |
| 4,825,206 | 4/1989 | Brice, Jr. et al. | 340/825.02 |
| 4,872,197 | 10/1989 | Pemmaraju | 379/93 |

OTHER PUBLICATIONS

"Hyperswitch Network for the Hypercube Computer", E. Chow et al., 1988, pp. 90–99, California Institute of Technology, Pasadena, Calif. 91109.

"The Torus Routing Chip", W. Dally et al., 1986, pp. 187–196, Department of Computer Science, California Institute of Technology, Pasadena, Calif., USA.

Primary Examiner—Joseph L. Dixon
Assistant Examiner—Gregory D. Leibold
Attorney, Agent, or Firm—L. Keith Stephens; Marc Block; David Koffsky

[57] ABSTRACT

A multi-dimensional, multi-nodal routing mechanism is described for relaying information from node to node using a header consisting of route descriptor bits. Each node's receiver/transmitter pair changes states as the information is guided to the destination node. The message is propagated over several nodes simultaneously to traverse the nodes and reach the destination node quickly. When the final node is reached, all alternate communication routes are freed.

15 Claims, 8 Drawing Sheets

ADAPTIVE ROUTING IN A PARALLEL COMPUTING SYSTEM

FIELD OF THE INVENTION

This invention generally relates to improvements in data processing applications in a parallel computing system and, more particularly, an effective method for routing data between parallel computing elements through an interconnected network with multiple interconnecting paths (e.g. a multi-dimensional torus network).

DESCRIPTION OF THE RELATED ART

This invention addresses the problem of low-latency message processing found in today's parallel computers. Such a computer system consists of a large number of "nodes" interconnected via a high speed communication network. Each node generally consists of a processor and memory The nodes operate independently and interact with each other by sending messages and blocks of data via the communication network.

The communication network interconnects the nodes, but because the number of nodes is potentially very large (e.g. thousands), it is impractical for each node to have a dedicated link to every other node in the system. Therefore, some regular topology of interconnecting links is usually employed, with each node having direct links to only a few neighbors. In such a network, in order to send information between nodes which are not directly connected a path must be found using intermediate nodes and the bridging links they provide.

Given such an environment, when one node needs to send a message to a non-adjacent node, there must be a mechanism for determining the intermediate links and nodes to use and for forwarding the message along those intermediate links with minimum delay. In a regular network, there may be many possible routes between two given nodes. The message delivery mechanism is able to select one route from the many possible, avoiding intermediate links and nodes which are busy or broken. Also, the message delivery mechanism is able to operate independently of the processor in each intermediate node.

In general, this invention's network topology is applicable to networking schemes having multiple nodes, with each node sharing communication links with its neighbors on all sides. An example of this type of a topological scheme is the multi-dimensional torus network.

Figure 1:
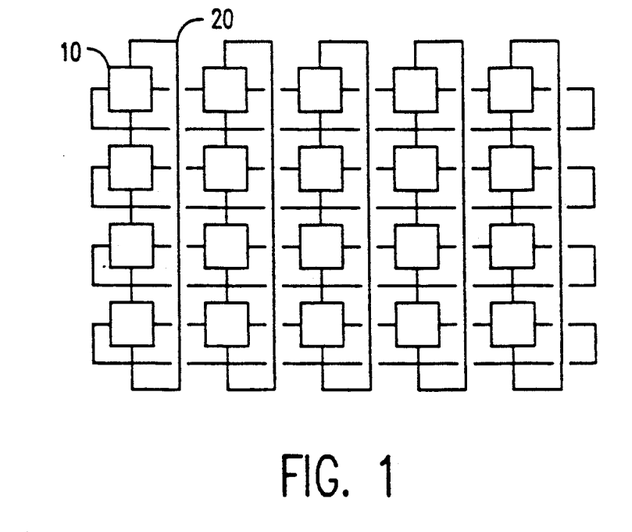
FIG. 1 shows the network topology of a conventional two-dimensional torus network in accordance with the present invention.

FIG. 1 illustrates the topology of a two-dimensional torus. Each box 10 represents a node and each line 20 represents a communication link. In FIG. 1, twenty nodes are interconnected in a five node by four node torus. A three-dimensional torus would have a plurality of two-dimensional networks logically stacked in the third dimension. Each node has two additional links, one to the counterpart in the two-dimensional torus above and one to the counterpart in the torus below. Larger dimensional torus networks are also possible.

Descriptions of parallel computing systems are found in U.S. Pat. Nos. 4,636,948, assigned to IBM; 4,514,807 to Tatsuo; 4,814,980 and 4,730,322 to California Institute of Technology; 4,811,214 to 4,543,630 to Teradata; 4,748,660 to Jeumont-Schneider; and 4,598,400 to Thinking Machines Corp. These patents describe various architectures for parallel processing that represent earlier development of routing systems similar to the subject invention.

The subject invention is designed to address the following requirements, heretofore never possible in a parallel processing environment. A key requirement is the ability to dynamically find the shortest available path and send a message over that path from any node to any other node in a multi-dimensional network, even if they are not directly connected. This capability is combined with a total transmission time which is only a fraction slower than the raw communication link speed. The communication link also requires the ability to dynamically adapt to changing network conditions including congestion and inoperative links, using alternate routes when required. Routing is accomplished without intermediate nodal buffering. This reduces costs and eliminates sequential searching when network resource blocking is encountered. Finally, any network resource must have the ability to be freed if the progress of the message is temporarily blocked.

Examples of prior art systems that failed to meet the requirements described above are found in routing chip", *Distributed Computing*, Springer-Verlag, New York, 1986; and Chow et al., "Hyperswitch Network For the Hypercube Computer"; *Computer Architecture News*, Vol. 16, No. 2 May 1988.

The Torus article describes a parallel computing network routing chip that is specifically designed to provide low-latency routing in a multi-dimensional torus network. The chip pre-establishes an order in which the messages are routed through intermediate nodes to reach their destination. A technique known as "cut through" routing is employed. This technique forwards each byte as soon as it is received at an intermediate node. Thus, total transmission time approaches raw link speed and no buffering is required at the intermediate nodes. A more detailed description of "cut through" routing is contained in "A Framework for Adaptive Routing in Multicomputer Networks", *ACM Symposium on Parallel Algorithms and Architecture*, 1989.

The problem with the Torus chip and, more specifically, "cut through" routing, is that the pre-established routes are static, based only on the relative positions of the source and destination nodes. If any link in the route is broken, the message cannot be routed through the network, even if an alternate route could have been used. Also, if there is a contention for some of the links in the network, the forward progress of one or more messages is temporarily blocked. This could, in turn, block the forward progress of one or more messages. The blockage of these messages in turn impacts other messages since blocked messages do not free the paths they are using. Thus, there is no ability to free network resources if the progress of a message is temporarily blocked.

The Hyperswitch reference is used to route messages in a hypercube computer. The hypercube is a special case of the multi-dimensional torus wherein the number of nodes in each dimension always equals two. The hyperswitch network performs adaptive routing. Thus, before sending a message, a search of all possible paths is performed to identify routes which avoid congestion and broken links. This gives the hyperswitch routing the ability to dynamically adapt to changing network conditions and inoperative links. The routing also requires no buffering and has the added capability of freeing up network resources if blockages are detected in the initial investigation of the network.

As mentioned above, the capability described in the hyperswitch article is of use only with a hypercube computer. This is extremely limiting given today's multi-dimensional network implementations. Further, the hyperswitch's sequential preliminary search is undesirable overhead.

The subject invention has none of the aforementioned problems or limitations.

SUMMARY OF THE INVENTION

According to the invention, these objects are accomplished by employing identical routing mechanisms located in every node of the system to efficiently route information from node to node. Each routing mechanism contains a transmitter/receiver pair coupled via a conventional crossbar (space) switch. Incorporated within each transmitter/receiver pair are bi-directional communication links with other adjacent nodes. Each transmitter/receiver pair contains dedicated links to the resident node's processor and memory.

Information is relayed from node to node using a header consisting of route descriptor bits. Each node's receiver/transmitter pair changes states as the information is guided to the destination node. The message is propagated over several nodes simultaneously to traverse the nodes and reach the destination node quickly. When the final nodal connection is accomplished, all subsequent communication links are freed via a command passed back over the network.

The invention has the capability of sending messages from any one node to any other node in a multi-dimensional network, even if they are not directly connected, The routing occurs at a total transmission time which approaches the point-to-point link speed.

The routing is architected to dynamically adapt to changing network conditions including congestion and inoperative links using an alternative route when required and no buffering of messages is employed. The architecture is flexible enough to detect blocked messages and dynamically release network resources to alleviate constraints in the network.

BRIEF DESCRIPTION OF THE DRAWINGS

The foregoing and other objects, aspects and advantages of the invention will be better understood from the following detailed description of the preferred embodiment of the invention with reference to the accompanying drawings, in which.

DETAILED DESCRIPTION OF THE INVENTION

Figure 2:
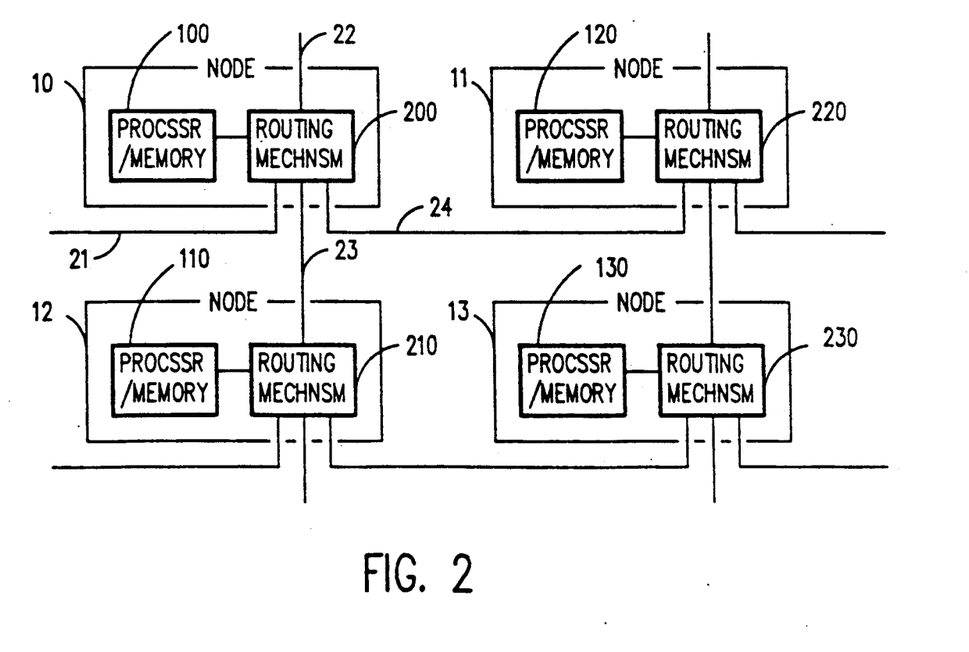
FIG. 2 is an illustration of the relationship between routing mechanisms and nodes in accordance with the present invention.

This invention utilizes multiple, identical routing mechanisms which are associated, one for one, with every node in the system. Referring to FIG. 2, the communication links between the nodes 10, 11, 12 and 13 connect directly with the routing mechanisms 200, 210, 220 and 230.

The communication links could be local area networks or any of a variety of other standard mediums of communication commonly employed today for communicating between nodes. The routing mechanism, processor and memory can be selected from any of a variety of commonly used processors and memory, such as the 80386 processor and compatible memory.

Each routing mechanism provides, in turn, a link to the corresponding node's processor or memory 100, 110, 120 and 130. Node 10 has each of its communication links 21, 22, 23 and 24 separately labeled to correlate with the detailed description of FIG. 3.

The number of links supported by the routing mechanism is variable and depends on the dimensionality of the network. To simplify the explanation of the invention, assume a two-dimensional network similar to the one shown in FIG. 1. In FIG. 1, each node 10 is connected to its four adjoining nodes via a communication link 20. A later discussion explains the additions necessary to support additional dimensions.

Figure 3:
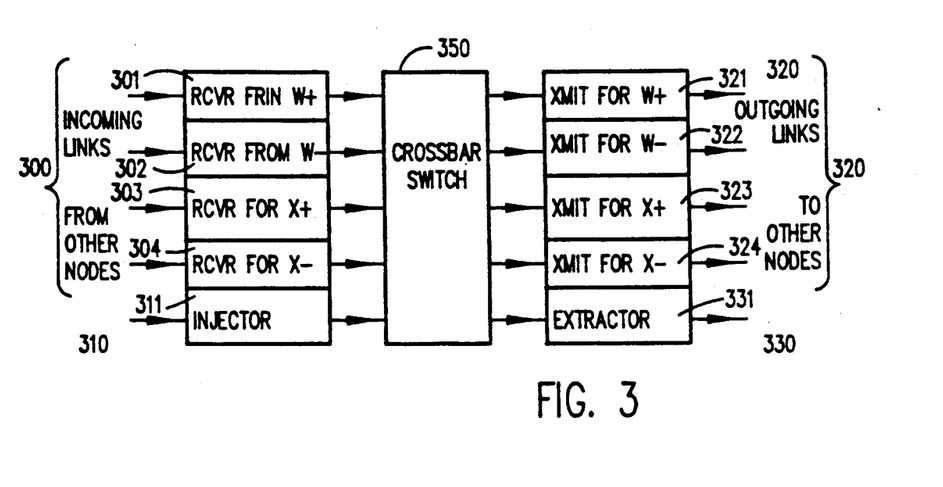
FIG. 3 is an illustration of the internal structure of the routing mechanism in accordance with the present invention.

FIG. 3 shows the internal architecture of the routing mechanism for a two-dimensional torus. For a two-dimensional torus, each routing mechanism supports four bi-directional links incoming links 300 and outgoing links 320 to other routing mechanisms (in other nodes) and one special incoming link 310 and outgoing link 330 to the processor or memory of its own node. Since the links are bi-directional, five receivers 301, 302, 303, 304, 310 and five transmitters 321, 322, 323, 324, 330 are required. A crossbar switch 350 is shown as an example of the hardware used to switch the information between the various links. Other embodiments of the invention could substitute a space switch for the crossbar switch.

Each link is appropriately labeled according to the direction the link sends data. Thus, the receiver for W+ 301 and the transmitter for W+ 321 correspond to communication link 21 in FIG. 2, the receiver for W− 302 and the transmitter for W− 322 correspond to communication link 22, the receiver for X+ 303 and the transmitter for X+ 323 correspond to communication link 23, the receiver for X− 304 and the transmitter for X− 324 correspond to communication link 24. The "injector" 310 is a special receiver which receives data from the node's processor or memory rather than from another node. The "extractor" 330 is a special transmitter which sends data to the node's processor or memory rather than to another node.

The crossbar switch 350 provides one-to-many switching from the link receivers 301-310 the link transmitters 321-330. To make connections, each receiver 301-310 presents a selection mask to the crossbar switch 350 indicative of the transmitter 321-330 it wants to transmit through. Connections are made by the crossbar switch 350 only if the particular transmitter is available. After a path is opened, a transmitter requests the crossbar switch to free the communication link that was previously connected.

Selection Masks

The selection mask comprises a four bit command word that is presented to the crossbar switch by each receiver. If the selection mask is all zeros, the crossbar switch initiates a path from that receiver to the extractor. If the selection mask is non-zero, each bit is used to indicate whether a path should be opened to the corresponding transmitter. For example, a selection mask of 0001 tells the crossbar switch 350 to attempt to open a path from the receiver that presented the mask, say receiver 301, to the W+ transmitter 321. A selection mask of 1010 requests two paths, one from the receiver 301 to the W− transmitter 322, and one from the receiver 301 to the X− 324 transmitter. When more than one path is opened through the crossbar switch 350, every byte generated by the receiver is sent to all connected transmitters.

Figure 9:
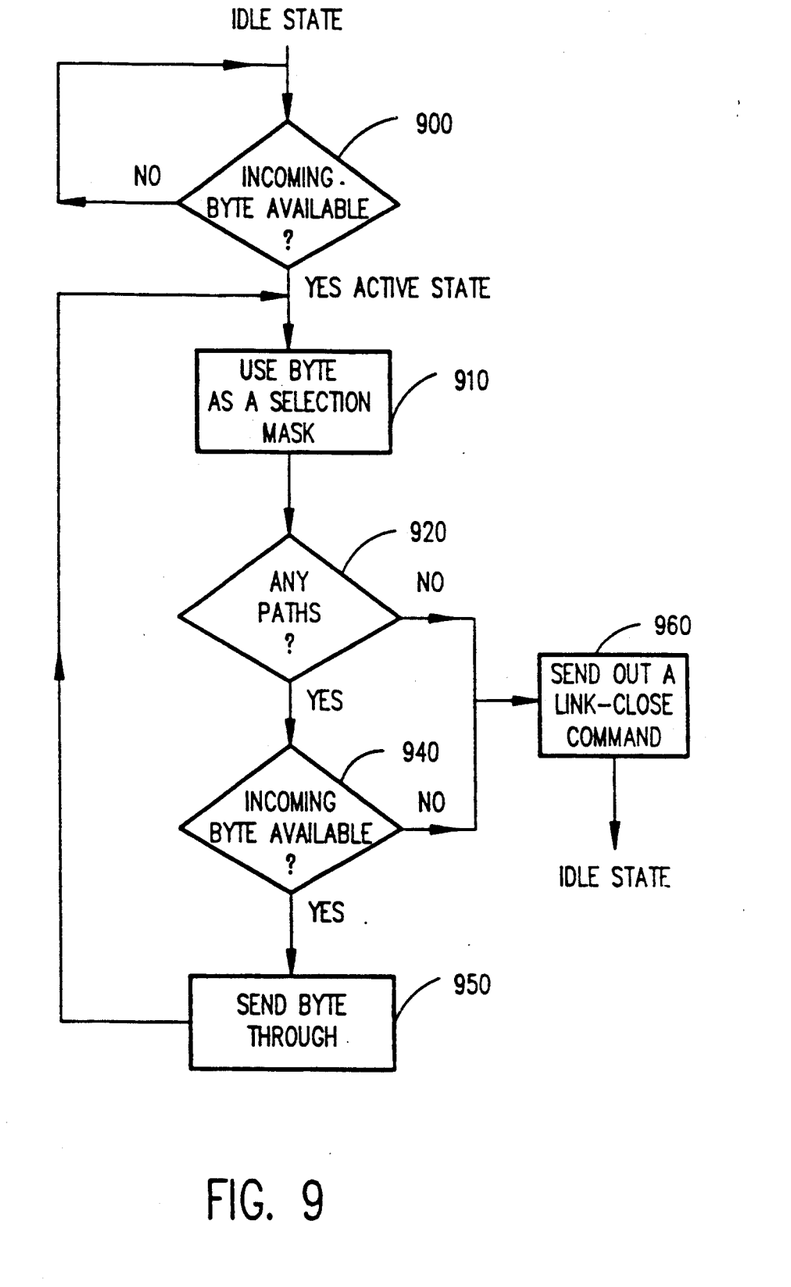
FIG. 9 is a flow chart illustrating the state changes for the receiver and injector modules in accordance with the present invention.

Referring to FIG. 9, a flow chart is shown illustrating the state changes of the receiver and injector modules. Each receiver has two primary states—IDLE and ACTIVE. When IDLE, the first byte received over a link marks the beginning of a message and causes that receiver to enter the ACTIVE state. Decision block 900 tests for a byte from the link or memory. If a byte is detected, the receiver enters the ACTIVE state. If not, the receiver returns to the IDLE State. In function block 910, the receiver uses the least significant nibble (four bits) of the "first received" byte as a selection mask (see above) for the crossbar switch. The selection mask, when presented to the crossbar switch, represents a set of desired paths to one or more transmitters.

Decision block 920 tests for busy or inoperable transmitters. If no transmitters are available, processing continues in function block 960 where a LINK-CLOSE command is sent backwards over the link. If at least one path through the crossbar switch is available, decision block 940 tests for an additional byte of data. If data exists, it is sent through the crossbar switch as shown in function block 950. If an additional byte does not exist, control is transferred to function block 960.

Figure 10:
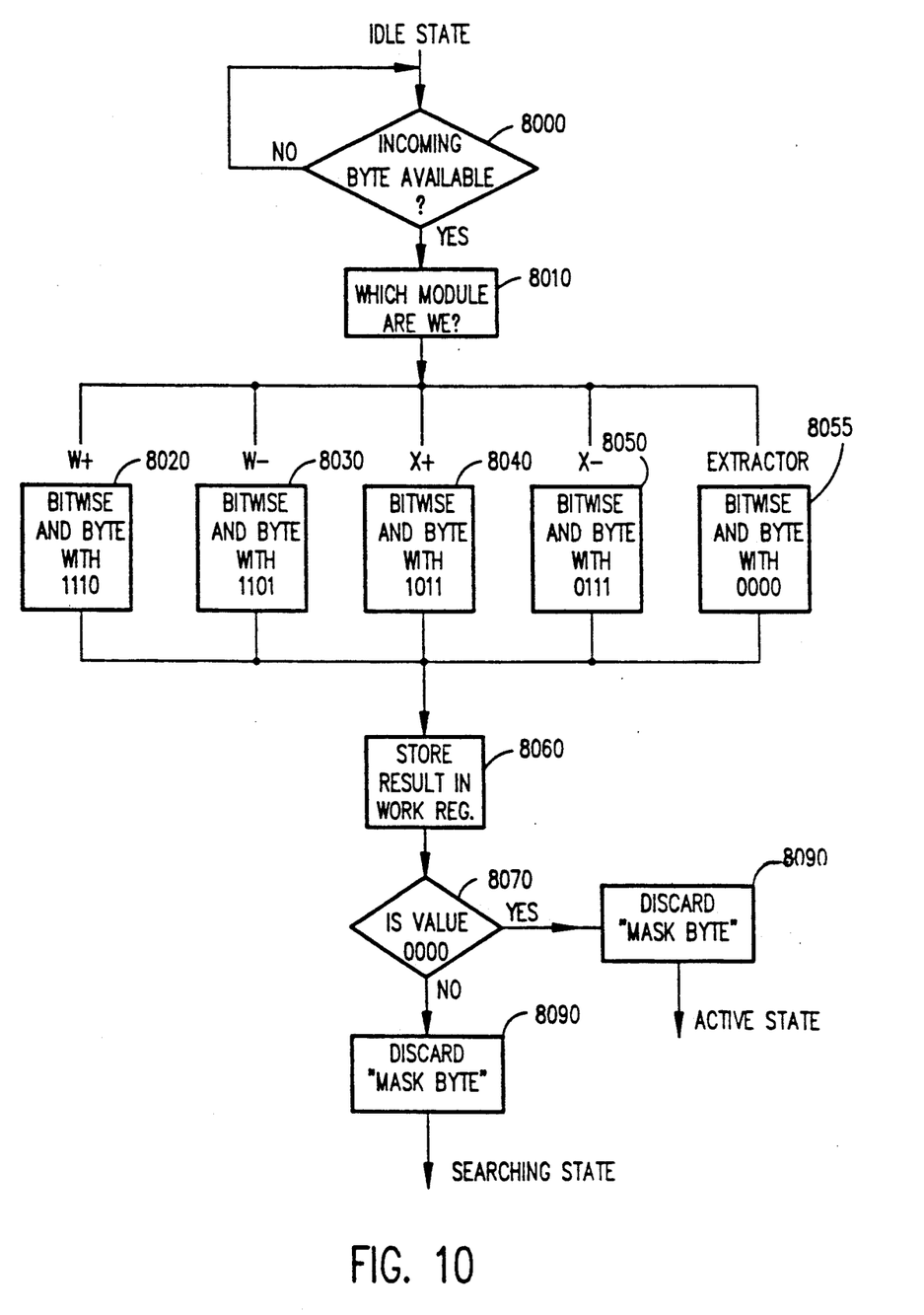
FIG. 10 is a flow chart illustrating the idle state for the transmitter and extractor modules in accordance with the present invention.

Referring to FIG. 10, each transmitter has four states—IDLE, SEARCHING, ACTIVE, and DELAYED. A transmitter starts in the IDLE state and remains in that state as long as it is not connected to any receivers via the crossbar switch as depicted in decision block 8000. In this state, it neither receives or transmits data. When the crossbar switch 350 connects a transmitter to a receiver, the first byte received by the transitter is the "selection mask" byte.

Function block 8010 performs a bitwise-AND with the "selection mask" as one operand and an identity based bit mask as the other. This operation selects a path through the crossbar switch 350. The possible values and their associated function blocks are shown below.

1110 for the W+ transmitter (8020)
1101 for the W− transmitter (8030)
1011 for the X+ transmitter (8040)
0111 for the X− transmitter (8050)
0000 for the extractor (8055)

Then, in function block 8060, the result is stored in a register called WORK. Once stored in the WORK register, decision block 8070 determines if the value is non-zero. If the value is non-zero, processing continues with function block 8090 where the "mask byte" is discarded. After discarding the "mask byte", the transmitter enters the SEARCHING state. If the value is zero, the process continues by discarding the "mask byte" and entering the ACTIVE state as the extractor.

Figure 11:
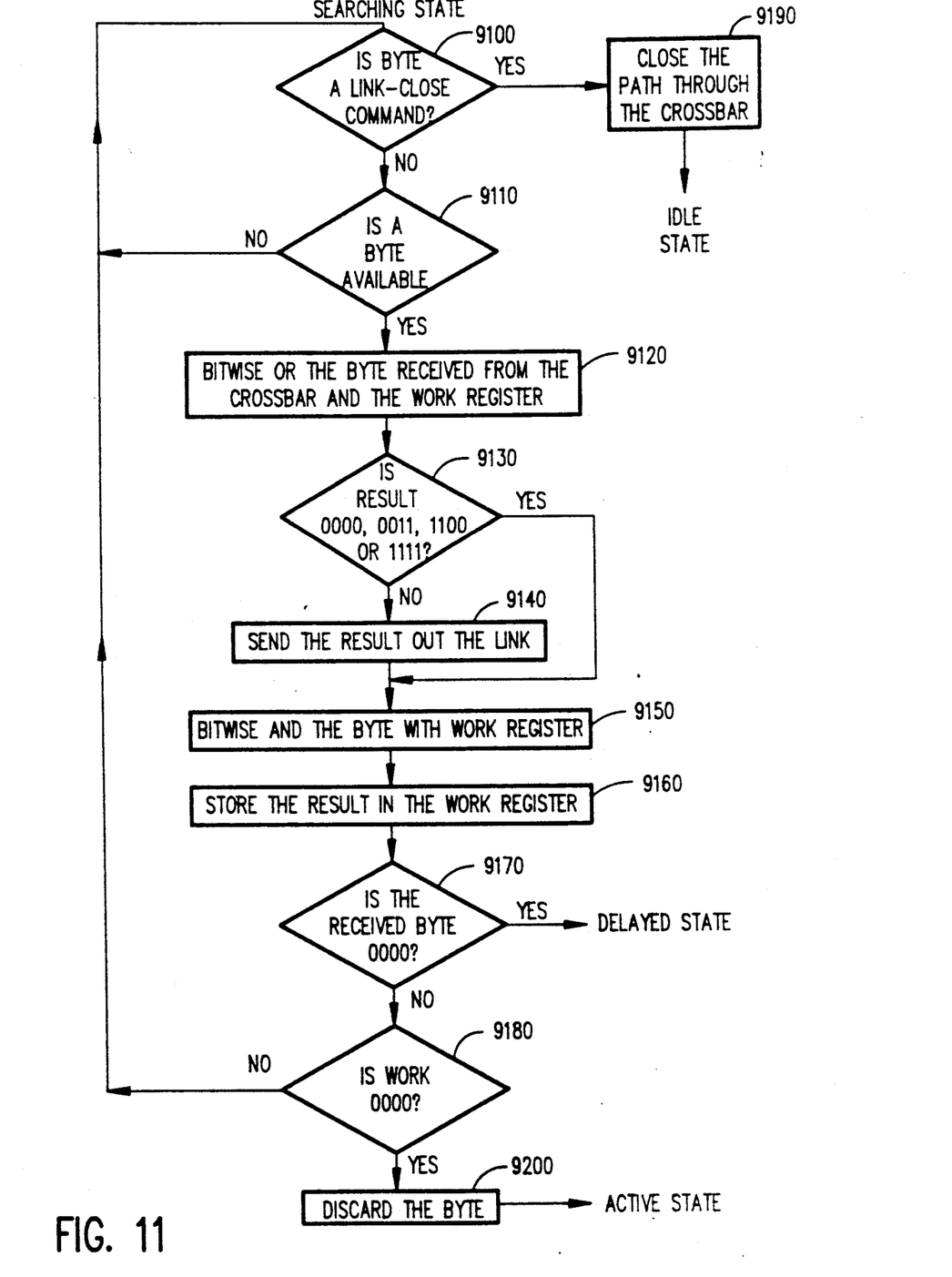
FIG. 11 is a flow chart illustrating the searching state for the transmitter and extractor modules in accordance with the present invention.

In the SEARCHING state, the transmitter modifies each subsequent byte it receives and sends the result out its link. A flow diagram is shown in FIG. 11 which outlines the SEARCHING state logic used by the transmitter and extractor.

In decision block 9100, a test is made to determine whether the received byte is a LINK-CLOSE command.

If the received byte is a LINK-CLOSE command the processing continues in function block 9190 where the path through the crossbar switch is closed and the state becomes IDLE.

If the received byte is not the LINK-CLOSE command, decision block 9110 determines if an additional byte is available from the crossbar switch. If not, the processing reverts back to function block 9100, else, a bitwise-OR is performed on the WORK register and the received byte. This takes place within function block 9120.

Then, in decision block 9130, the operation's results are compared to 0000, 0011, 1100, and 1111. If decision block 9130's test fail (i.e. no matches), the process continues in function block 9140 where the operation's result is sent to the next node. If a match is detected, function block 9150 performs a bitwise-AND on the received byte and the WORK register. The result becomes the WORK register's new value as shown in function block 9160.

In decision block 9170, the received byte is compared to 0000. If the received byte equals 0000, the transmitter enters the DELAYED state. If not, the WORK register's new contents are compared with 0000 in decision block 9180. If the contents equal 0000 the transmitter discards the received byte in function block 9200 and enters the ACTIVE state. If not, the process repeats by continuing in block 9100.

In the ACTIVE and DELAYED states, every byte received is sent out the transmitter's link without modification. If the information is destined for the extractor, this means that the byte is made directly available to the node's processor or memory. The difference between these two states is that in the DELAYED state, an extra byte needs to be sent out so incoming bytes are delayed one cycle in the WORK register.

Figure 12:
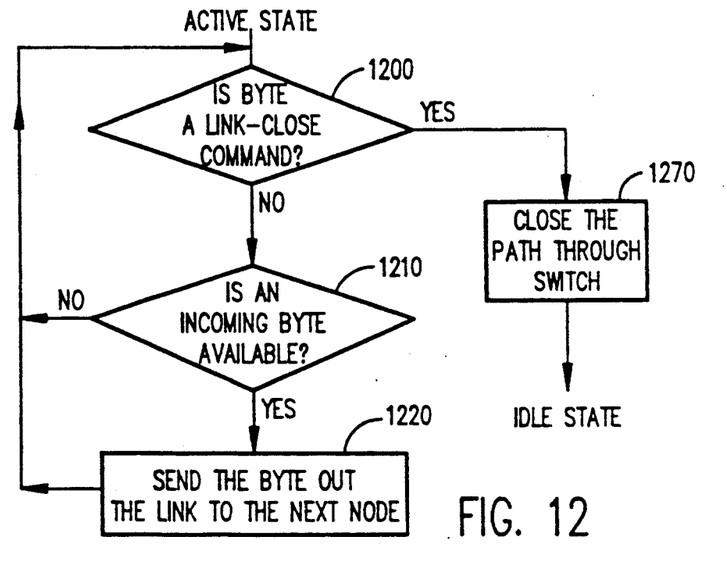
FIG. 12 is a flow chart illustrating the active state processing for the transmitter and extractor modules in accordance with the present invention.

The flowchart in FIG. 12 outlines the ACTIVE state for the transmitter and extractor modules. Within the ACTIVE state, function block 1200 determines if the received byte is a LINK-CLOSE command. If the received byte is a LINK-CLOSE command, the process continues in function block 1270 by closing the crossbar switch's path to this module. If the received byte is not a LINK CLOSE command, decision block 1210 determines if an additional byte exists. If not, the process continues in decision block 1200, else, function block 1220 sends the latest byte to the next node.

Figure 13:
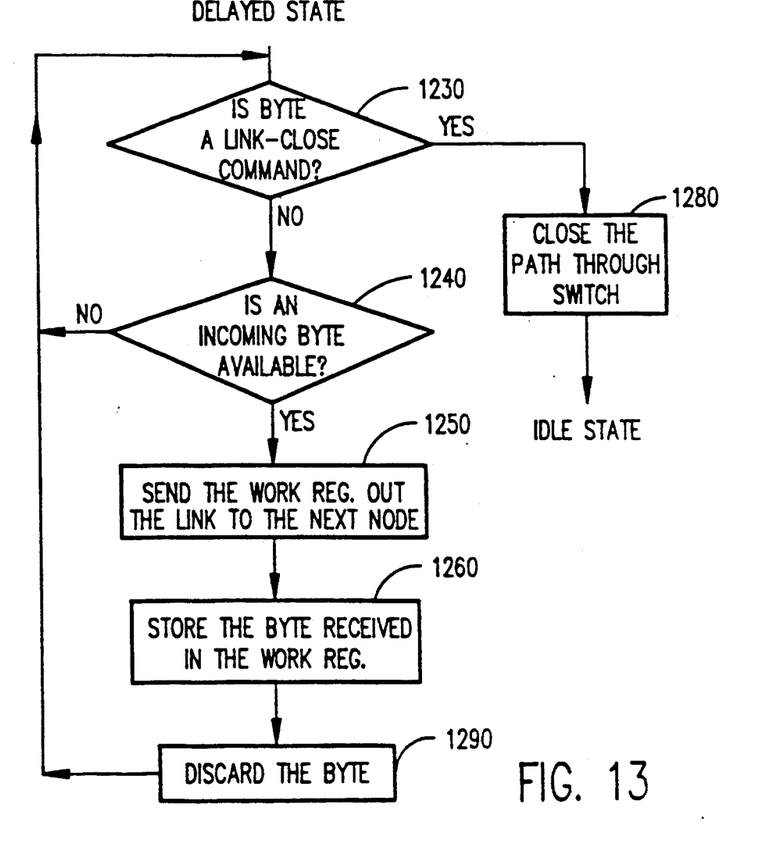
FIG. 13 is a flowchart illustrating the delayed state for the transmitter and extractor modules in accordance with the present invention.

The flowchart in FIG. 13 illustrates the DELAYED state processing. Processing commences with a test in decision block 1230 to determine if the received byte is a LINK-CLOSE command. If the received byte is a LINK-CLOSE command, the process continues in function block 1280 by closing the crossbar switch's path to this module. If the received byte is not a LINK CLOSE command, decision block 1240 determines if an additional byte exists. If not, the process returns to function block 1230, else, function block 1250 sends the contents of the WORK register to the next node. Function block 1260 then stores the received byte in the WORK register. Finally, as shown in function block 1290, the received byte is discarded.

If, while in either the SEARCHING, ACTIVE or DELAYED states, the receiver to whom the transmitter is sending data (ie. the one on the other side of the link) sends back a LINK-CLOSE command, the transmitter ends its participation in the transfer of that message, tells the crossbar switch to disconnect it from the receiver currently sending it data, and returns to the IDLE state. When all transmitters connected to a receiver return to the IDLE state, that receiver is informed that it is no longer connected to any transmitters and returns to the IDLE state. If a link is inoperative, the transmitter driving that link never leaves the IDLE state. If a byte is received through the crossbar switch for an inoperative link, the transmitter immediately instructs the crossbar switch to drop the connection as if it had received a LINK-CLOSE command. Finally, if a link becomes inoperative in the middle of a transmission, the transmitter immediately breaks the connection in the same manner.

In addition to data, a few commands can be sent backward and forward over each link and through the crossbar switch. These commands are implemented as separate control wires or as special inband escape characters in the data. The implementation varies with the link design.

The LINK-CLOSE command is sent backwards over a link (in the direction opposite data flow) from a receiver in one node to a transmitter in another node. As described earlier, LINK-CLOSE causes the transmitter to return to the IDLE state and close its connection through the crossbar switch. If there is only one open path through the crossbar switch, it also causes another LINK-CLOSE command to be sent, this time over a link one hop closer to the source node.

The END-OF-MESSAGE command is sent forward over links and through the crossbar switches from the source node to the destination node. The intermediate receivers and transmitters send the END-OF-MESSAGE command through the system as if it was a data byte. When the destination node receives the END-OF-MESSAGE command, it checks the message's cyclic redundancy check (CRC). If the CRC is correct, it sends back an ACKNOWLEDGE command followed by a LINK-CLOSE command. If the CRC is wrong, only a LINK-CLOSE command is sent.

The ACKNOWLEDGE command is sent backwards over each link from receiver to transmitter and backwards through each crossbar switch from transmitter to receiver. It is generated by the destination node only after successful reception of the message. Each intermediate routing mechanism sends the ACKNOWLEDGE command backwards to the source node without taking any action. At the source node, the ACKNOWLEDGE command is used to indicate that a message was received successfully.

To transmit a message, the source node generates a data stream consisting of the following sections (listed in order of transmission). The data should be presented to the injector of the routing mechanism of the source node at the same speed as each link in the network.
1. A routing header (zero or more bytes)
2. A zero byte (to end the header)
3. The message to be sent (zero or more bytes)
4. The CRC of the message (not including the header)
5. An END-OF-MESSAGE command If the message is received correctly, the source node should receive an ACKNOWLEDGE command from its injector followed by a LINK-CLOSE command. If the LINK-CLOSE command is seen without an ACKNOWLEDGE command, the source node knows that the message was not received and should be resent.

When a message arrives at its destination node, the bytes sent appears, in the order sent, from the extractor of the destination node's routing mechanism at the same speed as the links in the network. The header (including the zero byte which marks its end) does not appear at the destination, only the message, CRC and END-OF-MESSAGE command exits the extractor.

The checking of the CRC and generation of the END-OF-MESSAGE, ACKNOWLEDGE and LINK-CLOSE commands is handled by hardware between the routing mechanism and the node's processor or memory. The delay between END-OF-MESSAGE and ACKNOWLEDGE or LINK-CLOSE should be as short as possible since the routing mechanism holds a path back to the source node open until the final LINK-CLOSE is seen.

BASIC HEADER

The header, which is generated by the source node and sent at the beginning of the message, specifies what path or paths the message should take. In a two-dimensional torus, only the least significant nibble of each header byte is used. Each byte of the header has the following interpretation. (Bit 0 is the least significant.)

bit 0 Set to 1 to move one link in the W+ direction
bit 1 Set to 1 to move one link in the W− direction
bit 2 Set to 1 to move one link in the X+ direction
bit 3 Set to 1 to move one link in the X− direction
bits 4–7 Set 0 in a two-dimensional network To build the simplest type of header, the source node determines the relative distance between it and the destination node in each direction. The length of the header (in bytes) is equal to the distance travelled in the longest direction plus one byte of all zeros.

Viewing the bytes of the header as a table, with each byte representing a row and each column representing a direction (as indicated above), each column should be filled with as many ones as there are moves to the destination node in that direction. In each column, the ones should all occur before the zeros. Thus, the first byte of the header has the most bits set and the last byte are all zeros.

As an example, to send a message from node 0,0 to node 3,2 takes three moves in the W+ direction and two moves in the X+ direction. The basic header representing this movement would be four bytes long as shown below.

0000 0101—first byte sent 0000 0101
0000 0001
0000—end header

When header is received, the routing mechanism searches all possible direct paths between the source and destination nodes. Each path is tried simultaneously. The first byte stream to reach the destination node is used (held open until the end of the message). All the other paths are aborted (using LINK-CLOSE) as soon as they fail to reach the destination.

In the previous example, the following paths are all searched in parallel:

0,0 to 0,1 to 0,2 to 1,2 to 2,2 to 3,2,
0,0 to 0,1 to 1,1 to 1,2 to 2,2 to 3,2,
0,0 to 0,1 to 1,1 to 2,1 to 2,2 to 3,2,
0,0 to 0,1 to 2,0 to 2,1 to 3,1 to 3,2,
0,0 to 1,0 to 1,1 to 1,2 to 2,2 to 3,2,
0,0 to 1,0 to 1,1 to 2,1 to 2,2 to 3,2,
0,0 to 1,0 to 1,1 to 2,1 to 3,1 to 3,2,
0,0 to 1,0 to 2,0 to 2,1 to 2,2 to 3,2,
0,0 to 1,0 to 2,0 to 2,1 to 3,1 to 3,2,
0,0 to 1,0 to 2,0 to 3,0 to 3,1 to 3,2.

Figure 4:
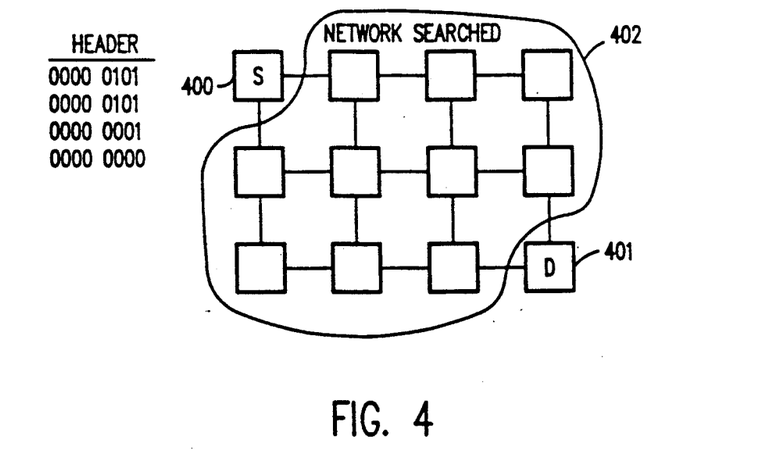
FIG. 4 is an illustration of a sample network in accordance with the present invention.

This can be graphically illustrated by showing the subset of the network searched when using this header. In the FIG. 4, the source node is marked with a "S" 400 and the destination node is marked with a "D" 401. The other nodes 402 shown are all visited during the search (unless there are inoperative links).

If one or more of the links in the network are busy or inoperative, the data traveling along paths which include those links do not reach the destination. A large search pattern is used to increase the probability that at least one path searched reaches the destination. If no paths reach the destination, a LINK-CLOSE command is returned to the source node without an ACKNOWLEDGE command. In that event, the source node should try to retransmit the message.

During a search, multiple streams of data corresponding to the same message converges on intermediate nodes and the destination node at approximately the same time. When two streams arrive at the same node, two receivers present selection masks to the crossbar switch asking for the same set of transmitters. It is the responsibility of the crossbar switch to arbitrate among its various inputs to guarantee that each transmitter is only connected to one output. Receivers which lose the arbitration are told that they are connected to no transmitters and, consequently, send back LINK-CLOSE commands.

ALTERNATE HEADER PATTERNS

The routing mechanism searches the network using the pattern specified in the header. No headers are invalid. By changing the basic header pattern described earlier, the number of paths searched can be increased or decreased as desired.

Figure 5:
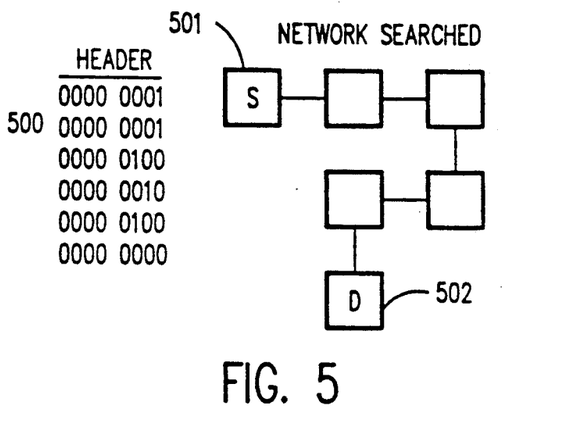
FIG. 5 is an illustration of a sample network search in with the present invention.

For example, by using as many bytes as there are total moves to the destination (plus one) and setting only one bit in each header, a single path can be specified. In FIG. 5, consider the header 500 for routing from (0,0) 501 to (1,2) 502 and its resulting search pattern.

Figure 6:
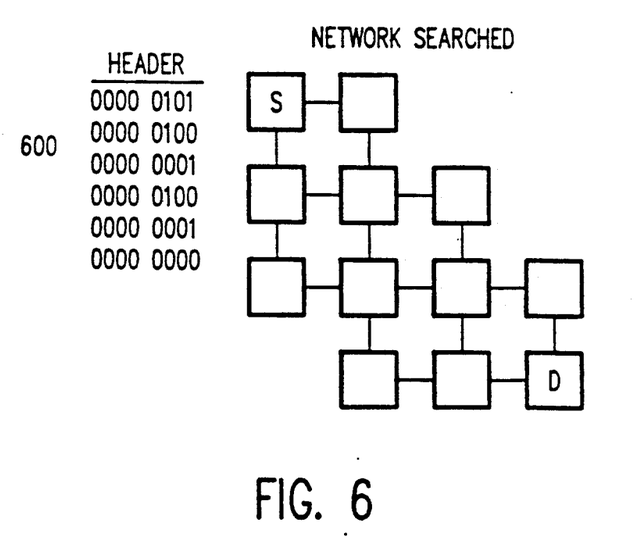
FIG. 6 is an illustration of another sample network search in accordance with the present invention.
Figure 7:
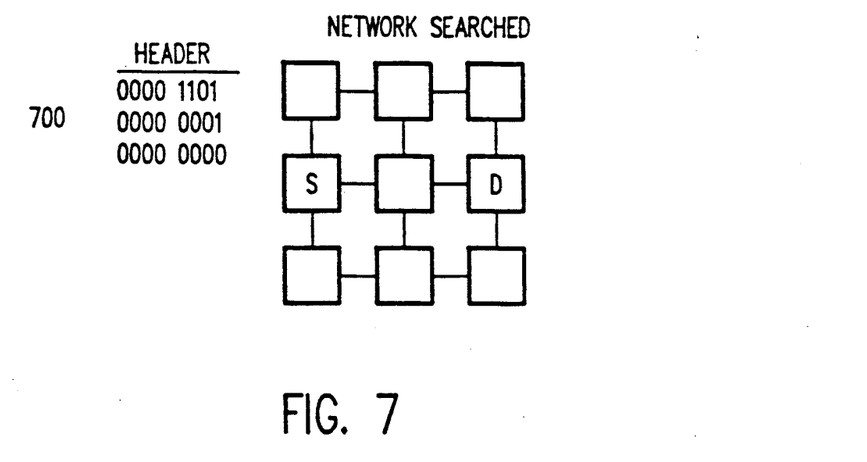
FIG. 7 is an illustration of another sample network search in accordance with the present invention.
Figure 8:
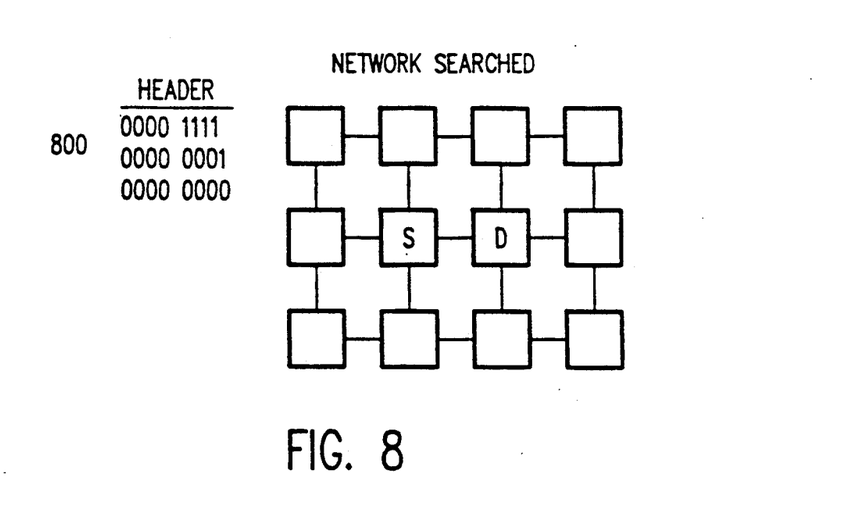
FIG. 8 is an illustration of another sample network search in accordance with the present invention.

The search pattern can be narrowed for messages which are being sent across many nodes by inserting extra zero bits in the middle of the columns of the header 600. An example of this is shown in FIG. 6. Notice that every line except the last must be non-zero.

By including redundant movement (positive and negative in the same dimension) it is possible to expand the search pattern to include alternate routes such as those illustrated in FIG. 7, 700 and FIG. 8, 800.

EXPANDING CONNECTIVITY

The following two examples expand a one dimensional path into a two dimensional search. In both cases, the routing mechanism uses the direct path if it is available since it is found first. The connectivity of this invention can be expanded in many different ways. The simplest way to expand connectivity is to use this invention in a network with more than two dimensions. To increase the number of dimensions, the routing mechanism in each node is expanded by adding additional receivers and transmitters. For example, the following is a summary of changes needed to use this invention in a four dimensional torus network:

1. Four links per node are added (Y+, Y−, Z+, and Z−);
2. The number of receivers is increased to eight;
3. The number of transmitters is increased to eight;
4. The crossbar switch is increased to nine ports;
5. All eight bits of each header byte are now used; and
6. The list of suppressed header values (see SEARCHING state) is increased to sixteen.

Another way to increase the connectivity of this invention is to increase the number of injectors and extractors in each node. Increasing the number of injectors requires only that the width of the crossbar switch be increased. Having multiple injectors means that nodes can send multiple messages simultaneously.

Increasing the number of extractors allows each node to have a number or separately addressable ports. To increase the number of extractors, the width of the crossbar switch is increased. To address the additional extractors, one of the normally suppressed header values (e.g. 0011) is used. For example, the following list is an example of the changes needed to add a second injector/extractor pair to a two dimensional network.

1. One additional injector is added.
2. One additional extractor is added.
3. The width of the crossbar switch is increased by one.
4. The header value 0011 is used to select the second extractor. When the crossbar switch is presented a selection mask of 0011, it does not connect the receiver to the W+ and W− transmitters; rather, the receiver is connected only to the second extractor.
5. When a transmitter is in the SEARCHING state and the byte it just received was 0011, it should perform the following steps instead of its usual activity:
   a. if the WORK register is NOT 0000, 0011, 1100 or 1111, then send this value out on the link to the next node;
   b. store the byte just received (0011) in the WORK register;
   c. switch to the DELAYED state; and
   d. discard the byte just received External connections to the routing system can be made using an additional injector/extractor pair. To do this, the additional injector and extractor are used as a receiver and transmitter for an additional bi-directional link. That "external link" is then wired to an external system such as a terminal or a wide area network gateway. When connected to the network using an external link, the external system can send and receive messages to any node in the system regardless of which node's routing mechanism it is directly attached to.

Another use of an external link is to connect two systems using this invention together. By connecting the injector/extractor pair of one node in one system to the injector/extractor pair of one node of one system to any node of the other. Headers to route messages between systems consist of the following parts:

1. A header which routes to the node with the external link;
2. A 0011 byte to cross the external link;
3. A header to route to the destination node relative to the node with the external link in the second system; and
4. A 0000 byte to route into the destination node.

The technology used to implement the inter-nodal links can vary. The invention only requires that the links be bi-directional and run at approximately the same speed. For example, the communication links could consist of a byte wide parallel bus with control links between the nodes. Another possible implementation is a pair of serial connections, one in each direction. The links can use a variety of protocols and accommodate a plurality of error correction schemes.

While the invention has been described in terms of a preferred embodiment in a specific system environment, those skilled in the art recognize that the invention can be practiced, with modification, in other and different operating systems within the spirit and scope of the appended claims.

What is claimed is:

1. A method for routing a message in a regular topology network between a source node and a destination node, said source node building a data transaction comprising a message and header, said header including bit groups that define nodal network paths, at least one node in one of said paths performing the steps of:
   (a) employing one of said bit groups of said header to establish multiple connections from an input link receiver to output link transmitters within said one node, each of said output link transmitters linked with a succeeding node, said input link receiver linked to a preceding node;
   (b) copying the header from said input link receiver to each of said connected output link transmitters;
   (c) modifying each copied header so that said copied header defines network paths to said destination node from succeeding nodes linked to one of said connected output link transmitters into which said header was copied; and
   (d) transmitting said modified headers and said message to said succeeding nodes.

2. The method as recited in claim 1, wherein in step (a) said header portion includes at least one bit position corresponding to each output link transmitter in said one node, said method comprising the further steps of:
   responding to a bit group state to establish said connection to a corresponding output link transmitter, except if said corresponding output link transmitter manifests busy or inoperative signals to indicate a non-available status; and
   transmitting to said preceding node a link-close signal in response to said manifestation of said busy or inoperative signals.

3. The method as recited in claim 2 wherein said header includes a plurality of bit groups, each bit position in a bit group corresponding to a network path along a predefined dimension in said network, identical bit positions in each bit group corresponding to network path directions along an identical predefined dimension.

4. The method as recited in claim 1 wherein said message is accompanied by an end of message command that terminates said message, said message having a variable length of zero or more bytes.

5. The method as recited in claim 4 wherein said one node, upon receiving an end of message command performs the following steps:
   transmitting an acknowledge command to said preceding node, followed by a link-close command.

6. The method as recited in claim 1 further comprising the step of:
   instead, as recited in step (a), of establishing a connection to one of said output link transmitter, transmitting a link-close signal to said preceding node when said one of said output link transmitter signals busy or inoperative.

7. The method as recited in claim 6 comprising, between steps (c) and (d), the added steps of: modifying a first bit group of said header to indicate network paths from one of said succeeding nodes that communication with said destination node and then modifying additional bit groups in said header to indicate network paths from additional succeeding nodes that communicate with said destination node.

8. An apparatus for routing a message in a regular topology nodal network, between a source node and a destination node, said source node building a data transaction comprising a message and header, said header including bit groups that define paths through said nodal network, at least one node in one of said paths comprising:
   switch means;
   a plurality of output link transmitters, each of said output link transmitters linked with a succeeding node;
   a plurality of input link receivers, each input link receiver coupled to a preceding node and responsive to a received bit group of a said header, to establish multiple concurrent connections through the switch means, to output link transmitters within said one node and for copying said header to each of said connected output link transmitters; and
   means for modifying each said copied header to define nodal network paths to said destination node from succeeding nodes linked to one of said output link transmitter into which said header was copied, whereby each of said output link transmitters transmits its modified header and said message to the succeeding node to which said one of said output link transmitters is linked.

9. The apparatus as recited in claim 8 wherein said header includes at least one bit position corresponding to each output link transmitter in said one node, said switch means responsive to a manifested binary value of a said bit position in said header from one of said input link receivers, to establish a said connection between the corresponding output link transmitter and said receiver.

10. The apparatus as recited in claim 8, wherein one of said input link receivers establishes one of said connections to a corresponding one of said output link transmitters, except if said corresponding one of said output link transmitters manifests busy or inoperative signals to indicate a non-available state, and if so, transmits to said preceding node a link-close signal in response to said busy or inoperative signals.

11. The apparatus as recited in claim 8 wherein said header includes a plurality of bit groups, each bit position in a bit group corresponding to a network path along a predefined dimension in said network, identical bit positions in each bit group corresponding to network path directions along an identical predefined dimension.

12. The apparatus as recited in claim 2 wherein a said means for modifying resides within each of said output link transmitters.

13. The apparatus as recited in claim 12 wherein each said means for modifying alters a first bit group of said header to indicate network paths from one of said succeeding nodes that communicates with said destination node and then alters additional bit groups in said header to indicate network paths from additional succeeding nodes that communicate with said destination node, whereby each of said output link transmitters transmits first said altered first bit group of said header to a linked succeeding node.

14. The apparatus as recited in claim 8 wherein said message is accompanied by an end of message command that terminates said message, said message having a variable length of zero or more bytes.

15. The apparatus as recited in claim 8 wherein each said input link receiver in said one node, upon receiving an end of message command, transmits an acknowledge command to said preceding node, followed by a link-close command.

* * * * *